UNITED STATES PATENT OFFICE.

CHARLES L. WESTRICH, OF GLENDALE, NEW YORK.

COMPOSITION OF MATTER, FOR COATING SURFACES.

1,360,066.    Specification of Letters Patent.    Patented Nov. 23, 1920.

No Drawing.    Application filed June 9, 1919. Serial No. 302,924.

*To all whom it may concern:*

Be it known that I, CHARLES WESTRICH, a citizen of the United States, and a resident of Glendale, in the county of Queens, city and State of New York, have invented a new and useful Improved Composition of Matter for Coating Surfaces, of which the following is a specification.

This invention relates to the coating of surfaces which is particularly adapted for the finishing of automobile bodies and the like, and it is an object of the invention to provide a composition of matter for said coating.

It is a further object of the invention to provide a coating for surfaces having a mottled effect, or of different colors and shades of colors, to produce a finish of variegated color, to thereby provide a finish for surfaces which is novel and enhancing the appearance of the article to which it is applied.

In carrying out the invention there is applied to the surface to be coated a base or foundation of a primary color, which is preferably light in color and comprising a pigment or paint, and may be applied in one or more layers.

After the base has dried sufficiently there is applied thereto my improved finish coating which is of a color contrasting to the color of the base, and consists of a composition of an acetous fermented liquid, such as vinegar, a malt liquid, such as beer, an oily or greasy substance, as glycerin, and a pigment, as lamp black. The composition consists of two parts of the acetous fermented liquid, two parts of the malt liquid, and one part of the glycerin, to which is added the pigment or lamp black to make the same of a consistency to be readily spread by a brush over the surface. By the mixing of the liquids together there is provided a vehicle for the lamp black or pigment which may be readily spread over the surface and of a viscosity to readily stick and not flow or run, and which will readily dry.

After the liquid vehicle carrying the lamp black has been applied to the base coating and while in a viscous state portions of the same are worked out as by rubbing or wiping with a piece of fabric or cloth whereby portions of the color of the base are exposed and portions of the finish at certain places will be of greater density than at others, thereby giving the article a finish having a mottled effect, or of different colors and shades of colors, and producing a finish of variegated colors which is not only novel but pleasing to the eye and enhancing the appearance of the article to which it is applied. After this coating is dry there is applied a layer or film of material which when dry will be hard, shining and transparent, such as varnish.

Having thus described my invention, I claim:

1. A composition of matter for coating surfaces, consisting of an acetous fermented liquid, a malt liquid, glycerin, and a pigment.

2. A composition of matter for coating surfaces consisting of vinegar, beer, glycerin and lamp black.

3. A composition of matter for coating surfaces, consisting of two parts of an acetous fermented liquid, two parts of a malt liquid, one part of glycerin, and a pigment to make the same of a consistency to be readily spread.

CHARLES L. WESTRICH.